US008640629B2

(12) United States Patent
Barbee et al.

(10) Patent No.: US 8,640,629 B2
(45) Date of Patent: Feb. 4, 2014

(54) BATTERY-POWERED ALL-ELECTRIC AND/OR HYBRID LOCOMOTIVE AND RELATED LOCOMOTIVE AND TRAIN CONFIGURATIONS

(71) Applicant: Norfolk Southern Corporation, Norfolk, VA (US)

(72) Inventors: Gibson V Barbee, Roanoke, VA (US); Gerhard A. Thelen, Virginia Beach, VA (US); Robert S Runyon, Roanoke, VA (US); Derick Vander Klippe, Cambridge (CA)

(73) Assignee: Norfolk Southern Corporation, Norfolk, VA (US)

( * ) Notice: Subject to any disclaimer, the term of this patent is extended or adjusted under 35 U.S.C. 154(b) by 0 days.

(21) Appl. No.: 13/731,541

(22) Filed: Dec. 31, 2012

(65) Prior Publication Data
US 2013/0167752 A1 Jul. 4, 2013

Related U.S. Application Data

(63) Continuation-in-part of application No. 13/411,843, filed on Mar. 5, 2012, now Pat. No. 8,342,103, and a continuation of application No. 12/434,393, filed on May 1, 2009, now Pat. No. 8,136,454.

(51) Int. Cl.
*B61C 3/02* (2006.01)
*B60L 7/10* (2006.01)
*B60L 11/18* (2006.01)

(52) U.S. Cl.
USPC ............. 105/61; 105/50; 105/35; 104/289

(58) Field of Classification Search
USPC ............. 105/26.05, 35, 49, 50, 61; 318/52; 701/19; 320/116, 118, 119, 125, 127, 320/132, 134, 135, 136, 150; 303/152, 303/22.6; 246/182 B, 182 C
See application file for complete search history.

(56) References Cited

U.S. PATENT DOCUMENTS

| | | | |
|---|---|---|---|
| 669,850 A * | 3/1901 | Painton | 105/50 |
| 6,170,587 B1 | 1/2001 | Bullock | |
| 6,487,477 B1 | 11/2002 | Woestman et al. | |
| 6,555,991 B1 * | 4/2003 | Zettel et al. | 320/137 |
| 6,591,758 B2 | 7/2003 | Kumar | |
| 7,386,391 B2 * | 6/2008 | Morariu et al. | 701/117 |
| 7,400,113 B2 * | 7/2008 | Osborne | 320/118 |
| 7,507,500 B2 | 3/2009 | Donnelly et al. | |
| 2002/0174798 A1 * | 11/2002 | Kumar | 105/50 |
| 2007/0272116 A1 | 11/2007 | Bartley et al. | |
| 2008/0029320 A1 | 2/2008 | Fleckner et al. | |
| 2008/0084186 A1 | 4/2008 | Elder et al. | |

* cited by examiner

*Primary Examiner* — Mark Le
(74) *Attorney, Agent, or Firm* — Goodwin Procter LLP

(57) ABSTRACT

Designs for a battery-powered, all-electric locomotive and related locomotive and train configurations are provided. In one particular exemplary embodiment, a locomotive may be driven by a plurality of traction motors powered exclusively by a battery assembly which preferably comprises rechargeable batteries or other energy storage means. The locomotive carries no internal combustion engine on board and receives no power during operation from any power source external to the locomotive. A battery management system monitors and equalizes the batteries to maintain a desired state of charge (SOC) and depth of discharge (DOD) for each battery. A brake system may be configured to prioritize a regenerative braking mechanism over an air braking mechanism so that substantial brake energy can be recovered to recharge the battery assembly. Many locomotive or train configurations involving battery-powered or battery-toting locomotive(s) may be implemented. In one embodiment, a battery-toting locomotive is directly coupled with and positioned between two diesel-electric locomotives, wherein the batteries recover energy from regenerative braking and/or supply power to drive traction motors.

46 Claims, 11 Drawing Sheets

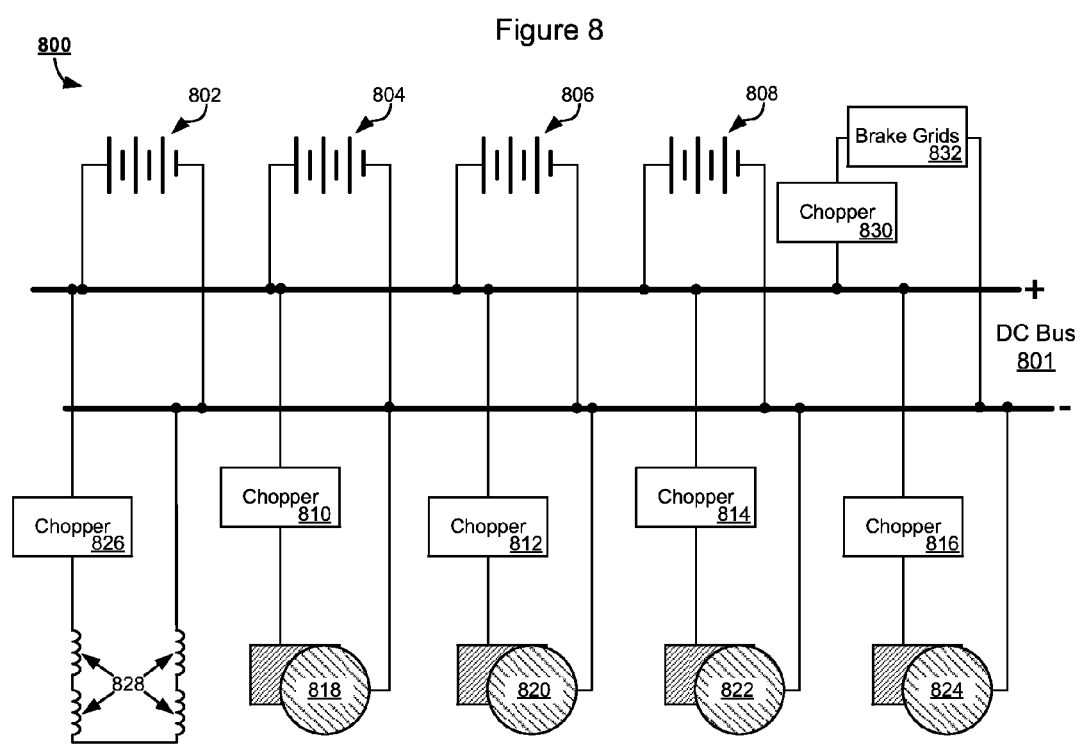

BATTERY-POWERED ALL-ELECTRIC AND/OR HYBRID LOCOMOTIVE AND RELATED LOCOMOTIVE AND TRAIN CONFIGURATIONS

CROSS-REFERENCE OF RELATED APPLICATIONS

The present application is continuation-in-part of U.S. patent application Ser. No. 13/411,843 filed on Mar. 5, 2012, which is a continuation of U.S. patent application Ser. No. 12/434,393 filed on May 1, 2009 and issued as U.S. Pat. No. 8,136,454. Both of these earlier applications are incorporated herein by reference in their entireties.

FIELD OF THE INVENTION

The present invention relates generally to commercial locomotives. More particularly, the present invention relates to a battery-powered, all-electric and/or hybrid locomotive and related locomotive and train configurations.

BACKGROUND OF THE INVENTION

Environmental and geopolitical concerns have motivated improvement on vehicle designs both to achieve better fuel efficiency and to reduce environmental impact. Recent years have seen development of hybrid vehicles in both automotive and railway industries. Hybrid vehicles operate on two or more energy sources, typically combining an energy storage system (e.g., batteries) or fuel cells with an on-board combustion engine.

In the automotive industry, Toyota® Prius™ brand hybrid cars have been the most successful. A Toyota® Prius™ can rely solely on a nickel-metal hydride (NiMH) battery to drive an electric motor in low-power conditions and switch to a gasoline engine in high-power conditions or when battery charge is low. In addition, the NiMH battery can be recharged by both the gasoline engine and a regenerative braking system. These and other features allow the Toyota® Prius™ hybrid vehicles to achieve relatively low levels of fuel consumption and carbon emission. All-electric (or plug-in type) automotives are also in the works but very few are commercially available.

The railway industry has also taken a definitive step towards more environmentally friendly locomotive designs. While all-electric railcars have been operated for decades, typically as subway or light-rail passenger carriers, they almost invariably have to rely on either an electric "third rail" or overhead cables for a continuous supply of power. However, the vast majority of railroads do not have third rails or overhead cables to accommodate electric locomotives, and costs of converting existing railroads are prohibitively high. In the United States, it was estimated that it would cost as much to electrify a railroad as it cost to build it in the first place. Overhead lines and third rails require greater clearances, and the right-of-way must be better separated to protect the public from electrocution. Therefore, recent innovations have been focusing on hybrid locomotives. Although there has not been a consistent definition of the term "hybrid," all existing hybrid locomotives appear to build upon the traditional diesel-electric locomotive platform and include one or more energy storage mechanisms to receive excess energy from the diesel engine or regenerative braking or both.

Among the most notable hybrid locomotives are those developed by East Japan Railway Company (or "JR East"), General Electric (GE), and Railpower Technologies (or "Railpower," a Canadian company). JR East's hybrid locomotive (2003 test design) included two 65-kilowatt fuel cells and six hydrogen tanks under the floor, with a lithium-ion battery on the roof. The JR East test train was capable of 60 mph with a range of 30-60 miles between refills. The GE hybrid locomotive is essentially a diesel-electric locomotive redesigned to capture the energy dissipated during braking and store it in a series of lead-free batteries. The stored energy can be later used on demand to reduce fuel consumption (reportedly by up to 15%). Railpower's hybrid locomotives include switchers known as "Green Goats" and "Genset" type locomotives. The Green Goat hybrid switchers are each powered by a small generator and a large bank of batteries. The Genset locomotives are powered by between two and four smaller diesel engines each, and they achieve part of their fuel savings and efficiency by turning engines on only as needed and shutting them down in low-power or idle conditions.

FIG. 1 shows a traditional design of a diesel-electric locomotive 100 based on which the various hybrid locomotive designs have been proposed. The traditional diesel-electric locomotive 100 typically comprises a diesel engine 102 that burns diesel fuel to power a generator 104. A high-voltage cabinet 106 regulates the electric current produced by the electrical generator (or alternator) 104 to drive a number of traction motors 108. The diesel engine 102 is referred to as the prime mover, while the electrical generator 104, the traction motors 108 and any interconnecting apparatus are collectively considered a power transmission system. Compared to this traditional diesel-electric locomotive 100, GE's hybrid design merely adds regenerative braking (with a limited energy recovery and storage capacity) to improve fuel efficiency of the diesel engine 102. Railpower's Genset design essentially splits the one diesel-electric engine 102 into two or more smaller engines and switches each engine on demand. JR East's hydrogen hybrid locomotive operates on essentially the same principle as the diesel-electric locomotive 100 but burns hydrogen fuel instead of diesel fuel.

Since the above-mentioned hybrid locomotives are still in development or early commercial deployment, their environmental contribution or commercial success is yet to be fully appreciated. These existing hybrid locomotive designs, however, do share one common feature—they still require on-board internal combustion engines as a direct or indirect power source and therefore still rely on fuels such as diesel or hydrogen. As a result, the existing hybrid locomotives either cannot truly eliminate carbon emissions produced by burning fossil fuel or have to rely on cleaner fuels at great expense. To date, there has not been any serious attempt at developing a battery-powered, all-electric locomotive with sufficient energy capacity and horsepower for commercial rail transport operations.

Generally, all-electric locomotives require configuring long strings of batteries in parallel to meet the energy storage requirements of trains. However, when batteries are configured in long strings, their cells do not typically perform uniformly. For example, when lead-acid batteries are configured in long strings, their charge levels typically become non-uniform. Generally, these batteries are balanced by overcharging them. However, overcharging lead-acid batteries typically results in problems such as gassing, drying out, and early battery failure. Accordingly, there is a need for batteries that perform uniformly when configured in long string configurations.

Even with improved batteries having high level of charge acceptances configured in long parallel strings, the inherent physical and chemical characteristics of these batteries nonetheless limit the energy storage system's ability to recapture a high horse power locomotive's via braking power. For example, a six-axle locomotive may generate 4,000 horsepower from regenerative braking, however, even batteries with high charge acceptance rates typically cannot accept more than 1,000-2,000 horsepower even in multiple parallel strings for long braking intervals. As a result, excess regenerative energy is lost. Simply increasing the amount of batteries used in an energy storage system to recapture the excess power is not a viable solution, because of the large amount of weight additional strings of batteries add to the train's load. Specifically, the additional weight of long strings of batteries may result in a net inefficiency. Further, federal regulations limit the total amount of weight allowed on an axle of a railcar. Accordingly, there is a need to manage a locomotive's regenerative power generation over time (energy) in order to accommodate the physical and chemical characteristics of an energy storage system.

In view of the foregoing, it may be understood that there are significant problems and shortcomings associated with current locomotive designs.

SUMMARY OF THE INVENTION

Designs for a battery-powered, all-electric locomotive and related locomotive and train configurations are disclosed. In one particular exemplary embodiment, a locomotive may be driven by a plurality of traction motors powered exclusively by a battery assembly which preferably comprises rechargeable batteries or other energy storage means. The locomotive carries no internal combustion engine on board and receives no power during operation from any power source external to the locomotive. A DC bus may couple the battery assembly to the plurality of traction motors. A battery management system monitors and equalizes the batteries to maintain a desired state of charge (SOC) and depth of discharge (DOD) for each battery. A motor control circuitry may operate in coordination with the battery management system to draw currents from the battery assembly to drive the plurality of traction motors according to desired throttle levels. The battery management system may further monitor the battery assembly with temperature sensors and may cause cooling or air-circulation equipment to equalize battery temperatures. A brake system may comprise both a regenerative braking mechanism and an air braking mechanism wherein the former is prioritized over the latter so that brake energy can be recovered to recharge the battery assembly.

In another particular exemplary embodiment, two or more battery-powered, all-electric locomotives may be coupled together and operate in tandem.

In yet another embodiment, one or more battery-powered or battery-toting locomotives may be coupled with one or more other types of locomotives such as diesel-electric locomotives. A battery assembly carried on the battery-powered or battery-toting locomotive(s) may be recharged with energy generated from regenerative braking and/or from engine(s) on the diesel-electric locomotive(s). The battery assembly may also supply battery power to drive traction motors on the battery-powered or battery-toting locomotive(s) and/or the diesel-electric locomotive(s).

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as described herein, and with respect to which the present invention may be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

FIG. 8 shows a circuit diagram illustrating power control operations of an exemplary battery-operated, all-electric locomotive in accordance with an embodiment of the present invention.

DETAILED DESCRIPTION OF THE INVENTION

Embodiments of the present invention provide for a battery-powered, all-electric locomotive that carries no internal combustion engine on board and needs no electric "third rail" or overhead cables for continuous power supply. Instead, embodiments of the all-electric locomotive are powered exclusively by batteries (or other energy-storing cells or capacitors) and can achieve sufficient horsepower and travel range in commercial applications. A number of batteries may be installed on a locomotive platform and coupled to traction motors via a DC bus. A battery management system may closely monitor electrical and thermal conditions of the batteries and provide charge equalization and temperature adjustment as needed. A regenerative braking mechanism may be implemented to recover brake energy to recharge the batteries thereby extending battery usage. Two or more of the all-electric locomotives may also be coupled together and operated in tandem for increased horsepower and extended travel range. Or, a battery-toting, all-electric locomotive may serve as a slug for one or two (or even more) diesel-electric locomotives. Many variations are possible for the design and configuration of the battery-powered, all-electric locomotive, as will be described in detail below.

Figure 1:
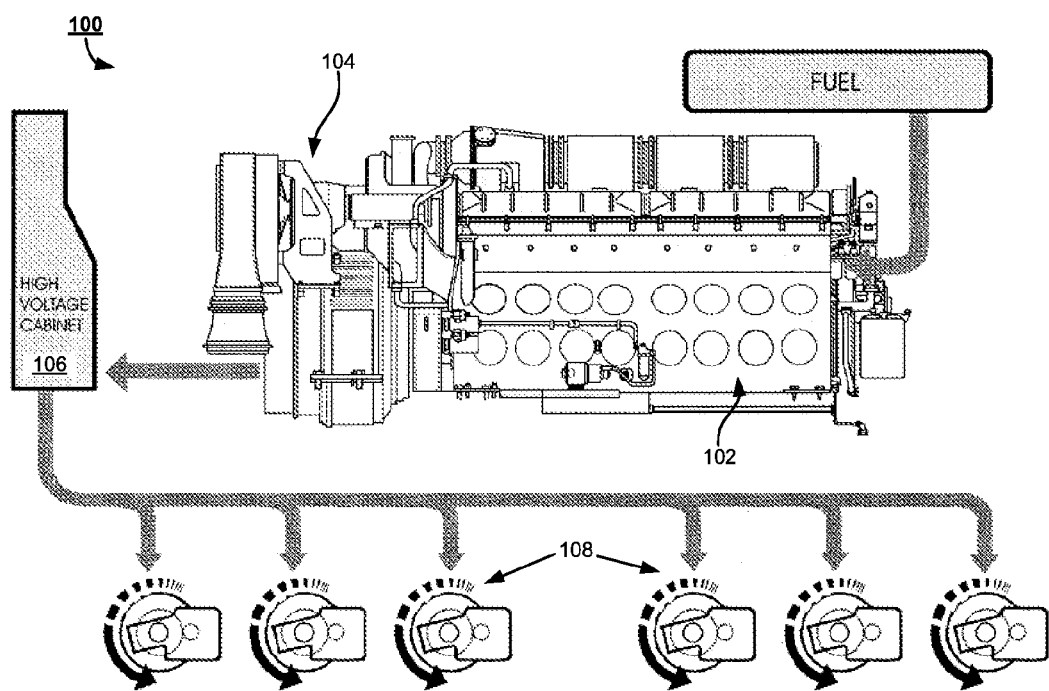
FIG. 1 shows a traditional design of a diesel-electric locomotive.
Figure 2:
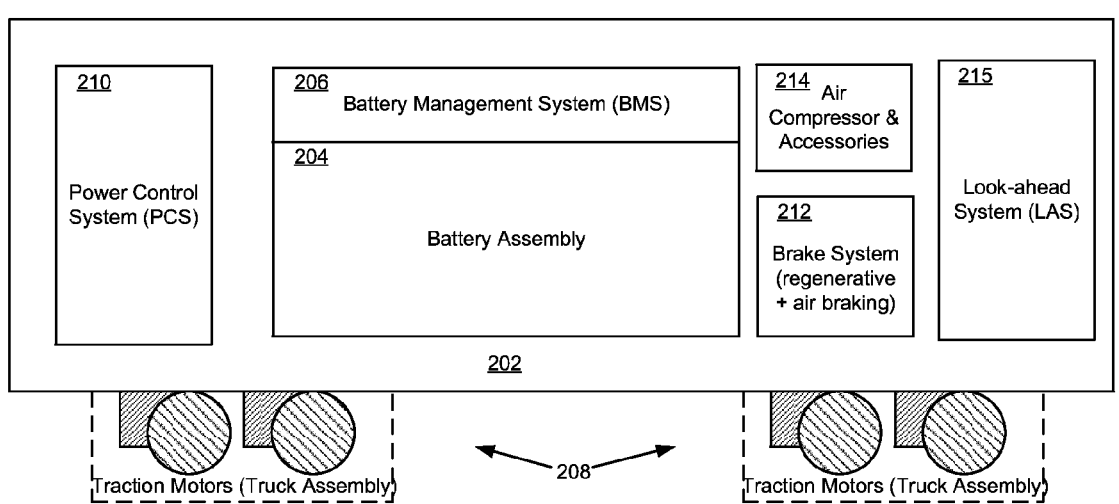
FIG. 2 shows a block diagram illustrating an exemplary battery-powered, all-electric locomotive in accordance with embodiments of the present invention.

Referring to FIG. 2, there is shown a block diagram illustrating an exemplary battery-powered, all-electric locomotive 200 in accordance with embodiments of the present invention.

The locomotive 200 may comprise a locomotive platform 202. The locomotive platform 202 may be the same as or somewhat similar to the mechanical framework of a traditional commercial locomotive, for example, in terms of dimensions, weight (ballast), and wheel arrangement, such that the locomotive 200 will be compatible with existing or standard railway tracks. However, in contrast to a diesel-electric locomotive, the locomotive platform 202 does not carry, and therefore is not configured to mount, any internal combustion engine.

The locomotive 200 may also comprise a battery assembly 204 which includes one or more strings of batteries. Each string of batteries may comprise a number of batteries or battery units electrically connected in series to provide a sufficiently high voltage and current output. The one or more strings of batteries together hold a sufficient amount of energy to propel the locomotive 200 as the battery assembly 204 is essentially the only on-board power source. Although not necessary, each battery in the battery assembly 204 is preferably identical and can be recharged multiple times to substantially the same energy capacity. The rechargeable batteries may be one or more of the following types: lead-acid, lead-carbon (PbC), zinc-bromine, nickel-zinc, nickel metal hydride (NiMH), lithium-ion (Li-ion), lithium polymer (Li-poly), lithium sulfur (Li—S), lithium-nickel-manganese-cobalt (NMC), or other types having at least an acceptable energy-to-weight (or energy-to-volume) ratio and capable of a sufficient surge current. According to one embodiment of the present invention, multiple strings of commercially available 12-volt lead-acid batteries may be arranged to form the battery assembly 204. The batteries may be organized into groups and subgroups, and each string of batteries may be connected to a common DC bus (not shown in FIG. 2).

When batteries are configured in long strings to form the battery assembly, as depicted as 204 in FIG. 2, their charge characteristics do not typically perform uniformly. For example, the charge levels of lead-acid batteries typically become unbalanced when they are configured in long strings. Although lead-acid batteries may be balanced by overcharging the batteries, overcharging lead-acid batteries typically results in gassing, drying out and early battery failure. In contrast, research and development has shown that lead-carbon batteries have properties that allow them to perform uniformly when configured in long strings. Specifically, lead-carbon batteries with comparatively low charge levels in a string will accept more current and bring themselves up to a high state of charge without drying out, because of the inherent resistance properties of carbon on the negative electrode Specifically, activated carbon will have a lower resistance at low SOC in a battery. With a lower resistance, the battery may charge with a higher current to a voltage limit while capturing more energy than conventional lead acid batteries. As a result, lead-carbon batteries have properties that require less charge equalization than other batteries in string configurations.

The battery assembly 204 may be periodically recharged at an electrical charging station when the locomotive 200 is not in operation. A charging interface may be provided to couple the battery assembly 204 to charging cables. The batteries may be recharged together simultaneously, or each string or battery group may be recharged independently from other strings or battery groups. The locomotive 200 may be plugged in for a period of time, for example, a couple of hours (rapid charge) or several hours (full or trickle charge).

The battery assembly 204 need not be recharged while installed on the locomotive platform 202. According to some embodiments of the present invention, instead of being plugged into or connected with an electrical charging station, some or all the batteries in the battery assembly 204 may be quickly disassembled and/or removed from the locomotive 200 and fresh, fully charged batteries may be installed. In fact, the battery assembly 204 may be designed as and/or configured into multiple modules with convenient yet secure interfaces to facilitate fast mechanical and electrical attachment and detachment with the locomotive platform 202. According to one embodiment of the present invention, the locomotive 200 may be so designed that the battery assembly 204 can be either recharged without dissembling or replaced for a quick turnaround. Whether a locomotive operator chooses the recharging or the replacement options may depend on whether a charging station or similar infrastructure is available and how soon the locomotive has to be back in operation.

According to other embodiments of the present invention, the batteries in the battery assembly 204 may be non-rechargeable but may be installed in a way that allows for fast replacement. As a result, the locomotive 200 might be refueled by quickly swapping the drained (or partially drained) batteries with fresh batteries. According to alternative embodiments of the present invention, other energy storing mechanisms, such as ultra-capacitors and flywheels, may be used in place of some or all of the batteries to serve the same or equivalent functions of rechargeable batteries in the locomotive 200.

The locomotive 200 may further comprise a battery management system (BMS) 206 to monitor and equalize the batteries in order to keep them in good working conditions. The BMS 206 may include or be coupled to various sensors and circuits to closely monitor a state of charge (SOC) and a depth of discharge (DOD) of each battery since it is desirable (at least for lead-acid batteries) to maintain all the batteries at substantially the same SOC or DOD level in order to extend their useful life. The SOC or DOD of a battery may be determined based on its terminal voltage, current input/output parameters, and battery temperature which can be tracked for an extended period of time. Since for a main function of the BMS 206 is to ensure every battery in the battery assembly 204 stay at substantially the same or similar SOC and/or DOD level, the BMS 206 may include charge equalization circuits that balance the batteries. One or more charge equalization circuit modules may be implemented for each string of batteries to balance batteries within that string. In addition, some of the batteries within each string may be designated and used as a charge holding tank or buffer during battery equalization. The battery equalization may be either a continuous or a periodic process, and the processes for the strings of batteries may operate independently from one another or can be coordinated by a central processor. The DC bus may allow the parallel strings to further equalize with one another. In coordination with a power control system (described below), the BMS 206 may also limit each battery's DOD to a desired range in order to extend the lifetime of the rechargeable batteries. Furthermore, the BMS 206 may help limit average current going into or out of each battery or battery group.

Apart from battery equalization, the BMS 206 may also monitor the temperatures of the batteries or battery groups and keep the temperatures within a desired range and relatively uniform among the batteries or battery groups. A number of temperature sensors may be attached to individual batteries or deployed among the battery groups. Temperature readings may be processed by a microprocessor or microcontroller to determine whether to automatically activate on-board cooling or air-circulation equipment to adjust and equalize battery temperature. Preferably, batteries of each string are placed in proximity with one another, such that the batteries of that string will not experience too much difference in temperature.

The battery assembly 204 and the BMS 206 may be referred to collectively as a rechargeable energy storage system (RESS).

Referring again to FIG. 2, the locomotive 200 may also comprise a power control system (PCS) 210 that controls at least traction motors 208 and a brake system 212. The PCS 210 may incorporate at least some of the functionalities of a high-voltage cabinet typically found on a traditional diesel-electric locomotive. The high-voltage cabinet may include at least one additional function—to trip circuit breakers for each battery string upon a detection of fault conditions related to that string. In addition, the PCS 210 may be coupled with the battery assembly 204 via the DC bus and further in communication with the BMS 208. In accordance with another embodiment of the invention, the PCS may control the voltage or current loads of each string individually, with an insulated-gate bipolar transistor ("IGBT") chopper circuit located between the battery assembly and the common DC bus. This allows the PCS to control the voltage and current levels of each individual battery string based on the battery string SOC and the battery string's state of health.

The PCS 210 operates to draw a current from the batteries, based on throttle level, to drive the traction motors 208. Depending on railroad operations, the locomotive 200 may be equipped with, for example, four axles or six axles and corresponding number of traction motors 208. The traction motors 208 may be either direct current (DC) motors or alternating current (AC) motors. According to one embodiment of the present invention, DC motors may be more preferable due to simplicity of the required control circuitry. The traction motors 208 may be coupled directly or indirectly to the common DC bus. To control battery current and power supplied to the traction motors 208, the PCS 210 may include one or more DC-DC converters or chopper circuit modules. According to one embodiment, one chopper may be employed to control armature current for each traction motor 208, while an additional chopper may be employed to control a current in a series circuit containing field windings of the traction motors 208. The chopper circuit modules may turn on the traction motors 208 in a timed sequence in response to control signals.

The PCS 210 may also be in communication with the brake system 212 to control or assist braking operations. The brake system 212 may include both a regenerative braking mechanism and an air braking mechanism. By operating some or all of the traction motors 208 as generators during braking operations, the regenerative braking mechanism may capture kinetic energy of the locomotive 200 and convert it back to electricity to recharge the battery assembly 204. Since the air braking mechanism does not restore energy to the batteries, the regenerative braking mechanism is prioritized over the air braking mechanism to maximize energy recovery. The air braking mechanism may be activated only when additional braking force is needed.

Referring again to FIG. 2, the locomotive 200 may further comprise a look-ahead system ("LAS") 215, coupled to the RESS, PCS and braking system. The LAS processes information about the locomotive's geographic position, energy information associated with the RESS, and information about train tracks and routes. The LAS may process information about the locomotive's geographic position with a Global Positioning System (GPS) receiver that receives signals from GPS satellites, local positioning system (LPS) receivers that receive signals from nearby radio towers, cell base stations, and the like, and/or other location tracking systems. Information about train tracks and routes generally includes information about a track or route that impacts the power provided by the locomotive. For example, the LAS may process information about the topography of a route to determine when a locomotive will approach a steep incline, which would require an increase of power from the RESS. On the other hand, the LAS may indicate when the locomotive will approach a steep decline, which, in contrast, would deliver energy to the RESS generated by the regenerative braking system. Track information may also include information about the location of wayside charge stations along the train's route to a particular destination. As described in more detail below, the LAS uses the track and route information to optimize the amount of regenerative energy recaptured by the RESS. Track information may be stored in the LAS, or received in real-time from a satellite system or network server.

The locomotive 200 may further comprise at least one air compressor and other accessories 214. The air compressor may be used to operate the air brakes, among other things. The accessories 214 may include a variety of common equipment for the operation of the locomotive 200, such as, for example, electronic accessories, the above-mentioned cooling or air-circulation equipment, and safety devices.

It should be noted that FIG. 2 is only a conceptual overview of the main components of a battery-powered, all-electric locomotive in accordance with embodiments of the present invention. The arrangement (e.g., positioning and grouping) of the various components is not limited by the illustration in FIG. 2. Indeed, some of the components (or portions thereof) may be grouped or positioned differently from the illustration. For example, parts of the BMS 206, such as the current sensors and temperature sensors, may be integrated with or as part of the battery assembly 204, and the brake system 212 or its control portion may be combined with the PCS 210.

From the overview of the present invention as provided above in connection with FIG. 2, it may be appreciated that a battery-powered, all-electric locomotive according to embodiments of the present invention may offer a number of advantages over diesel-electric locomotives and existing hybrid locomotives. The battery-powered locomotive needs no on-board diesel or gasoline engine to generate electricity from expensive fossil fuels, and the battery assembly can be recharged from cheaper and cleaner energy sources. As a result, the battery-powered locomotive can achieve a higher level of cost efficiency with a low or zero level of carbon emissions, not to mention the elimination of issues inherent with operating an on-board internal combustion engine (e.g., fuel storage and safety, engine space and weight, mechanical vibration and noise, and heat management). The battery-powered locomotive also does not require third rails or overhead lines for power supply. The construction or deployment of charging stations (scattered along the railroads) for the battery-powered locomotive is much less costly than electrifying entire railroads.

It should also be appreciated that a battery-powered, all-electric locomotive in accordance with the present invention may be designed and configured in a number of different ways based on intended use of the locomotive. For example, the battery-powered locomotive may be intended for long-haul transport of freight or passenger on railroads or for switching or shunting railcars in a rail yard. The intended use may dictate the power output and capacity of a battery assembly needed for the locomotive as well as other specific requirements. Among the many design options, the choice of battery type may be the most influential upon the rest of the locomotive design and configuration. In the disclosure below, a battery-powered locomotive using 12-volt rated lead-acid batteries in its RESS is described as an example. It should be noted that, although some of the description might be specific to 12-volt lead-acid batteries, the disclosed systems and methods may be adapted for other battery types to build and operate battery-powered locomotives as taught by the present invention.

Figure 3:
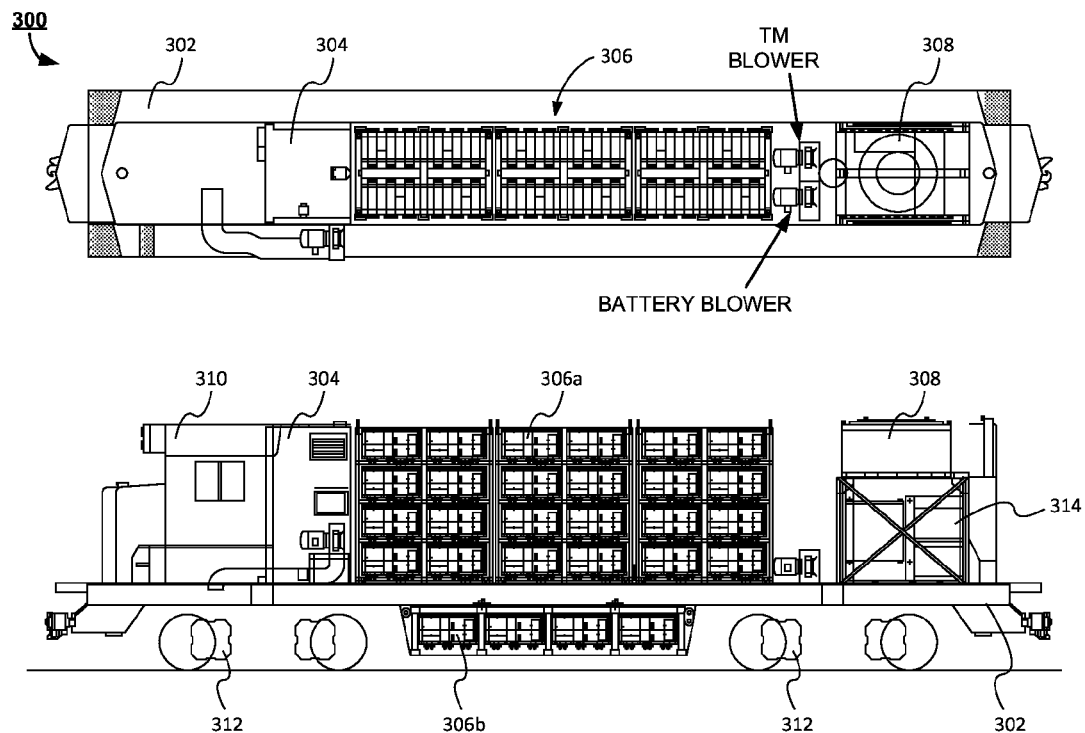
FIG. 3 shows a top view and a side view of the mechanical structure of an exemplary battery-powered, all-electric locomotive in accordance with an embodiment of the present invention.

FIG. 3 shows a top view and a side view of the mechanical structure of an exemplary battery-powered, all-electric locomotive 300 in accordance with an embodiment of the present invention. The locomotive 300 is a Norfolk Southern GP38-2 locomotive that has been modified to run exclusively on battery power. The locomotive 300 comprises a platform 302 that is about 59 feet in length and is driven with four DC traction motors 312.

A battery assembly 306 aboard the locomotive 300 may occupy a space in the center portion of the platform 302 which was previously reserved for a diesel engine and a generator. The battery assembly 306 may include 20 strings of 12-volt lead-acid batteries with 54 identical batteries connected in series within each string. The 20 strings may be connected to a common DC bus in parallel with one another. The 54 12-volt rated batteries within each string theoretically provide a 54×12V=648V output although the nominal voltage can range from about 540V to 790V depending on SOC of the batteries. As shown in FIG. 3, the batteries are arranged into 60 modular trays (also referred to as tubs or skids), with 48 trays (upper rack 306a) above the floor of the platform 302 and 12 trays (lower rack 306b) below the floor. Each tray may contain 18 batteries and three trays make up a complete string. According to one particular embodiment of the present invention, the 20 strings may be evenly divided into 4 groups with 5 strings in each group, wherein each group of batteries may be recharged independently from the other groups. Four independent charging modules may be provided to recharge the four groups.

Figure 4:
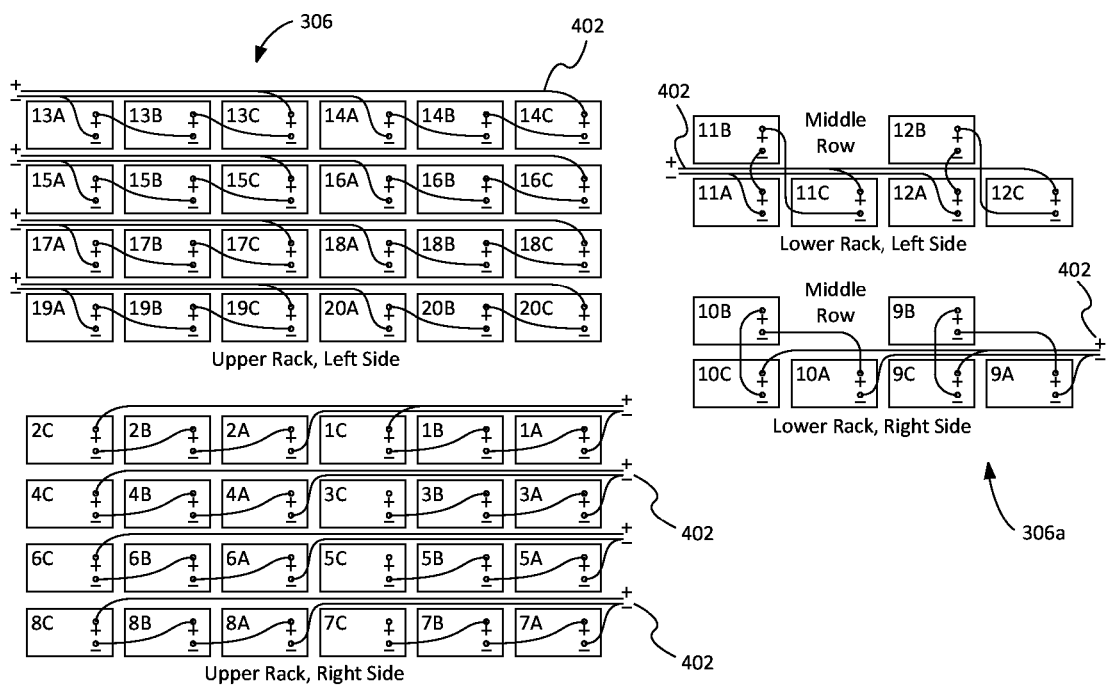
FIG. 4 shows an exemplary arrangement and wiring of battery trays in a battery assembly in accordance with an embodiment of the present invention.

FIG. 4 shows an exemplary arrangement and wiring of these battery trays (306) in accordance with an embodiment of the present invention. The upper rack 306a holds 48 trays with 24 trays on either side. The lower rack 306b holds 12 trays arranged in three rows with four trays per row. The 60 battery trays are identified with alphanumerical codes such as 1A, 2B, and so on, wherein the numeric part indicates the string number and the alphabetic part (A, B, or C) indicates tray sequence within each string. In each string, three trays (18 serially connected batteries per tray) are connected in series and then coupled to a DC bus via cables 402. For example, in String No. 1 (highlighted in an oval circle in FIG. 4), trays 1A, 1B and 1C have their positive and negative terminals alternately wired with the extreme terminals connected to the DC bus.

Figure 5:
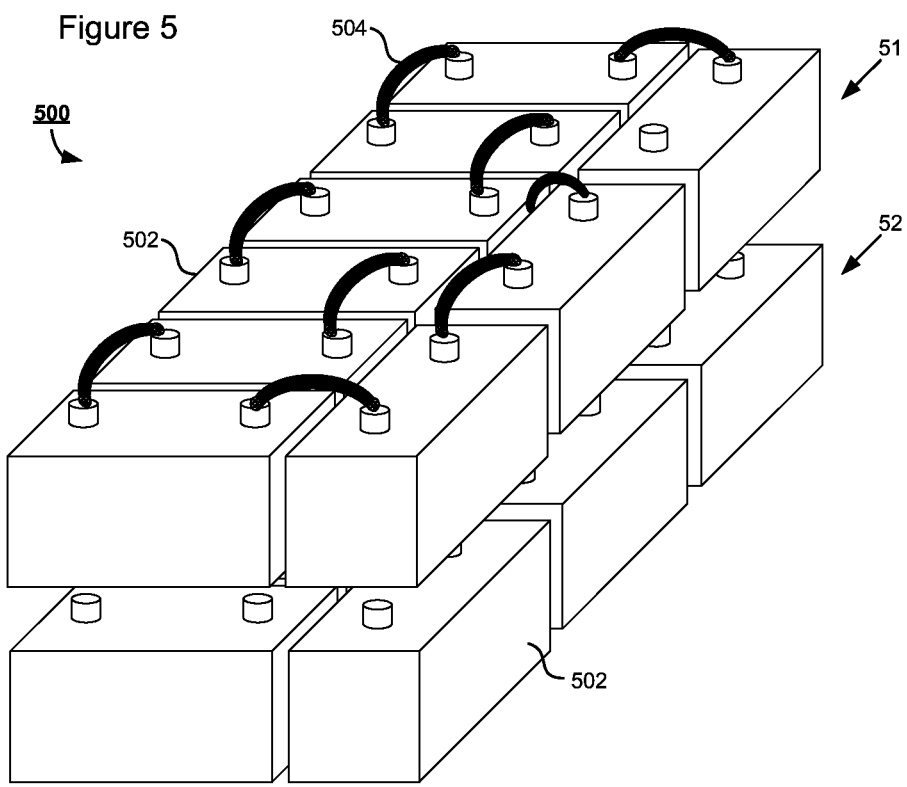
FIG. 5 shows an exemplary tray of batteries in a battery assembly in accordance with an embodiment of the present invention.

FIG. 5 shows an exemplary battery tray 500 in the battery assembly 306 in accordance with an embodiment of the present invention. Only batteries 502 in the tray 500 are shown. The mechanical frame of the battery tray 500, which is not shown, may comprise individual battery compartments and can be made of a metal, alloy, or polymer material that is relatively strong, durable and heat-resistant. As mentioned earlier, each of the battery 502 may be a 12-volt lead-acid battery. According to one particular embodiment of the present invention, each battery 502 may be a Group 31 lead-acid battery (for a volume-capacity trade-off). The Group 31 lead-acid battery is 12-volt rated and measures approximately 13 inches in length, 6.72 inches in width, and 9.44 inches in height. Within the battery tray 500, nine of the batteries 502 may be arranged in an upper layer 51 and the other nine may be arranged in a lower layer 52. The batteries 502 are connected in series by cables 504. The battery tray 500 and battery compartments therein may be so designed that upper and lower layers (51 and 52) and/or individual batteries can be independently slid out for service and replacement. The battery tray 500 and battery compartments may also accommodate various cables, wires, sensors, and connectors, most of which are not shown here in FIG. 5.

Referring back to the locomotive 300 in FIG. 3, a battery management system or functional components thereof may be integrated with or incorporated in the battery assembly 306. For example, according to some embodiments of the present invention, one BMS unit may be implemented on each battery tray to perform various monitoring and equalization functions on the batteries as will be described below in connection with FIGS. 6 and 7.

The locomotive 300 may also comprise a high-voltage cabinet 304 that houses a power control system (PCS) to control, among other things, the traction motors 312 as well as braking operations. The high-voltage cabinet 304 may be coupled to the battery assembly 306 and the traction motors 312 via the common DC bus. One or more blowers may be provided in or around the battery assembly 306 to cool it down or to equalize the temperature of the batteries. The locomotive 300 may also carry a brake grid 308 and related devices to handle excessive energy generated by dynamic braking which cannot be restored to the battery assembly 306. Additional accessories 314 may include an air compressor, auxiliary batteries, and cooling equipment, among others.

An operator cabin 310 may be provided at or near the front end of the locomotive 300 and may house a variety of user interface equipment. For example, the operator cabin 310 may be equipped with a Locomotive Engineer Assist Display/Event Recorder® (LEADER) or similar electronic system adapted to monitor and adjust the operating conditions of the battery-operated, all-electric locomotive 300. In addition to the usual information displayed on the LEADER screen (e.g., train speed, acceleration, and track conditions), battery status information and related adjustment suggestions or alerts may also be displayed to a train operator. According to some embodiments of the present invention, the operator cabin 310 need not be installed at the front end of the locomotive 300 and sometimes may not be part of the locomotive 300 at all. Video and computer monitoring may enable a train operator to control the train somewhat remotely. For example, the train may be controlled from an operator cabin or compartment located towards the rear end of the locomotive 300, while the battery assembly 306 may be positioned towards the front of the locomotive 300. One potential advantage of this "battery-forward" arrangement may be a more efficient use of natural air flow during train movement to cool the battery assembly 306. Alternatively, a cab-less design may be adopted wherein the operator cabin 310 may be completely removed from the locomotive 300 and located on a railcar pulled by the locomotive 300, thereby freeing up space for additional batteries and/or other equipment on the platform 302.

Figure 6:
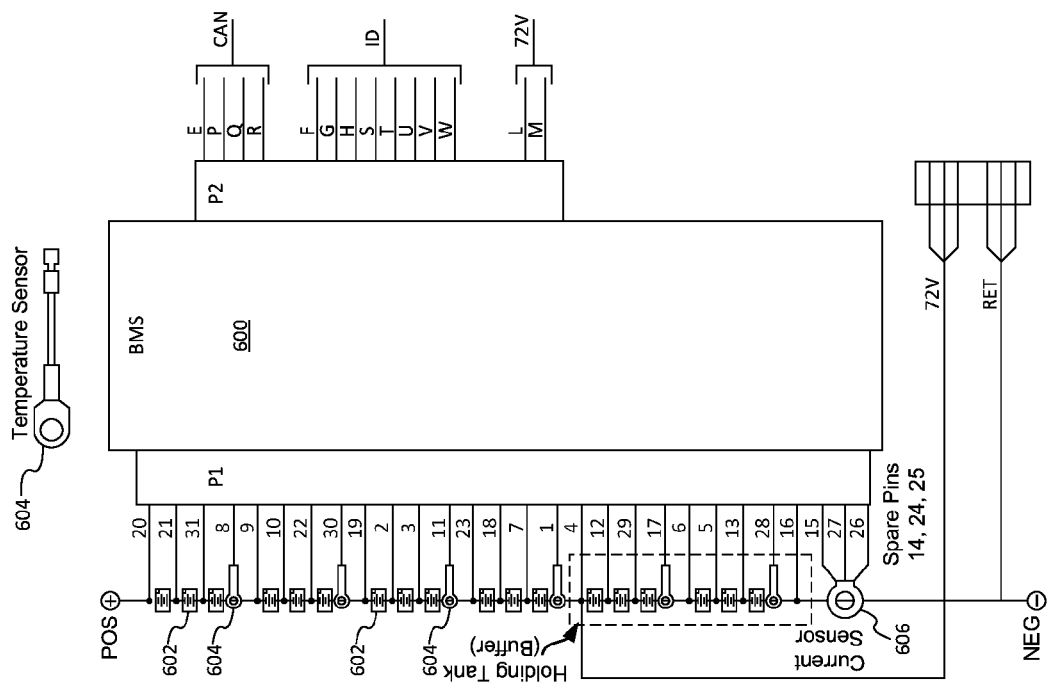
FIG. 6 shows a block diagram illustrating a portion of an exemplary battery management system in accordance with an embodiment of the present invention.

FIG. 6 shows a block diagram illustrating a portion of an exemplary battery management system in accordance with an embodiment of the present invention. A BMS unit 600, embodied in a microcontroller integrated circuit (IC) chip, for example, may be implemented for a string of batteries or a portion thereof. Continuing the 12-volt lead-acid battery example shown in FIGS. 3-5, the BMS unit 600 may be attached to one tray of 18 lead-acid batteries 602 which are connected in series. On the input side, a 31-pin plug (P1) handles wiring between the BMS unit 600 and the positive and negative nodes of each battery 602, which may sense 18 voltage readings. One temperature sensor 604 may also be deployed for every three batteries, and the six sensors 604 also feed their measurement data to the BMS unit 600 via the P1 interface. According to another embodiment, four temperature sensors can be used for every 18 batteries. In addition, a current sensor 606 is also coupled to the BMS unit 600, which monitors currents going in and out of the series of 18 batteries. On the output side of the BMS unit 600, another plug P2 may facilitate a controller-area network (CAN) bus interface which allows the BMS unit 600 to communicate with other microcontrollers and devices without a host computer. The P2 interface may also output an 8-bit identification code (ID) that identifies the BMS unit 600 and/or its related batteries or battery group.

Main functions of the BMS unit 600 may include voltage and current measurement, temperature monitoring, and charge equalization.

A main building block of the BMS unit 600 may be a charge equalization circuit comprising a DC-DC converter that can work in both directions to either charge a "low" battery (with a low SOC) or remove charge from a "high" battery (with a high SOC). By working in both directions, the equalization process may proceed much faster than using a conventional DC-DC converter that can only operate in one direction. This bi-directional DC-DC converter may use a temporary buffer for battery equalization. Charge is transferred between the temporary buffer and the 12V batteries 602. If a battery is "low," then energy will be removed from the temporary buffer and put into that battery. If a battery is "high," then energy will be removed from that battery and put into the temporary buffer. During equalization there should be just as many "high" batteries as "low" batteries so there is no net energy added to the temporary buffer. According to one embodiment of the present invention, the charge equalization circuit may be able to remove approximately 2 A from overcharged batteries and return approximately 0.75 A to undercharged batteries. Six of the 18 batteries 602 may be designated as a charge holding tank or buffer which may be used by this or other BMS units during a charge equalization process, as will be described below in connection with FIG. 7.

The BMS unit 600 may also be configured to monitor the state of charge (SOC) and/or depth of discharge (DOD) of each battery 602. For the Group 31 lead-acid batteries, it may be preferable to limit discharge to 35% or 30 Amp*hours per battery in order to protect the battery assembly and extend its useful life. According to one embodiment, the BMS unit 600 may estimate the SOC of a battery, with a 1.6 A parasitic load, for example, based on a combination of parameters such as integrated current discharge (Amp*hours) and terminal voltage. When the terminal voltage has decreased to approximately 10.5-10.8V, it may be determined that the battery has reached its end of cycle and should be recharged before further operation.

Figure 7:
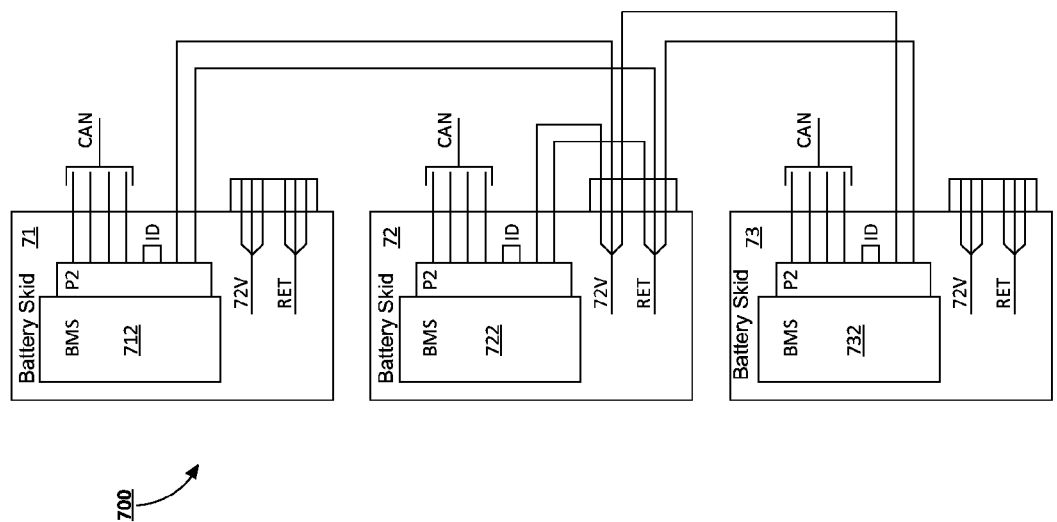
FIG. 7 shows a block diagram illustrating portions of an exemplary battery management system as applied to a string of batteries in accordance with an embodiment of the present invention.

FIG. 7 shows a block diagram illustrating portions of an exemplary battery management system as applied to a string of batteries (700) in accordance with an embodiment of the present invention. Continuing with the exemplary battery tray (or battery skid) shown in FIG. 6, the string of batteries (700) may include three battery skids (71, 72, and 73) each including 18 batteries 602 (not shown here in FIG. 7). One BMS unit (712, 722, or 732), the same as or similar to the BMS unit 600 shown in FIG. 6, may be implemented for each of the battery skids 71, 72, and 73. The 72V and RET terminals of only the center skid 72 are connected to corresponding terminals on the P2 interfaces of all three BMS units 712, 722, and 732, while the 72V and RET terminals of the battery skids 71 and 73 are left open. This cross-wiring among the battery skids 71, 72, and 73 allow the charge equalization circuits of all three BMS units 712, 722, and 732 to share the above-mentioned six batteries in the center skid 72 as a 72-volt charge holding tank or buffer.

FIG. 8 shows a circuit diagram illustrating power control operations of an exemplary battery-operated, all-electric locomotive (800) in accordance with an embodiment of the present invention.

The locomotive 800 may comprise a number of batteries organized into, for example, four groups 802, 804, 806, and 808 and connected in parallel to a DC bus 801. In the above-described example involving 20 54-battery strings, as shown in FIGS. 3-5, the 20 strings may be partitioned into four battery groups with five strings per group. Average current flowing in or out of each battery group and/or string may be monitored for any deviation from a set of throttle-dependent target values, as will be set forth below. Whenever battery current is the limiting quantity used for operational control, the highest current in any group will apply.

The locomotive 800's power control system may comprise five DC-DC converters or chopper circuit modules (810, 812, 814, 816, and 826), one for each traction motor armature (818, 820, 822, or 824) and one for a circuit serially connecting the motor field windings 828. All five choppers may be coupled to the common DC bus 801. Each chopper (armature or field) may be given a "turn-on" signal at the uniform rate of 1000 times per second. The four armature choppers 810, 812, 814, and 816 may be given turn-on signals in sequence, each following that for the previous chopper by one fourth of the switching interval, in order to minimize ripple in the supply current. To permit balanced operation with both motors in a truck cut out, the switching sequence should be 1324 or 1423 (with 1 and 2 referring to a first pair of motors on a first truck and 3 and 4 to a second pair on a second truck), such that the remaining pair of motors (or truck) are triggered at half the overall switching interval. The single chopper 826 used for the motor fields may be switched independently or synchronized with one of the choppers (810, 812, 814, or 816) used for armature control.

Upon arrival of the turn-on signal a chopper will switch to its conducting state if not already conducting, but only if the corresponding armature or field current is less than its limit value as defined below. When the corresponding armature or field current reaches or exceeds its limit value, the chopper will immediately switch back to its non-conducting state and remain so until arrival of the next turn-on signal. According to embodiments of the present invention, a current limit value is preferably maintained for each chopper, serving as a primary means of regulating motor current by controlling its peak value. However, the current value that is needed for operational control is the DC average value instead. The power control system may maintain the current limit individually for each chopper, adjusting as needed such that the DC average current will match the value prescribed below for throttle control.

Table 1 below lists target current values for an exemplary power control system to reference in operating the locomotive 800 powered exclusively by 20 strings of 12-volt lead-acid batteries with 54 batteries per string.

TABLE 1

Target Current Values

| Throttle Position | Armature Current (A) | Battery Group Current (A) | Battery String Current (A) |
|---|---|---|---|
| 8 | 1500 | 396 | 80 |
| 7 | 1260 | 324 | 65 |
| 6 | 1050 | 261 | 52 |
| 5 | 840 | 198 | 40 |
| 4 | 660 | 198 | 40 |
| 3 | 510 | 198 | 40 |
| 2 | 390 | 198 | 40 |
| 1 | 270 | 198 | 40 |
| Idle | 0 | 198 | 40 |

According to some embodiments of the present invention, traction motor armature current (DC average value) should be controlled to the least of the following: (a) the target value listed above for armature current; (b) the amount needed to maintain battery group current at its target value listed above; and (c) the temporarily reduced amount needed to limit the rate of current increase when the throttle is advanced. Traction motor field current (DC average value) should be controlled to match the armature current at all times, except while correcting a wheel slip condition or as described below.

However, as train speed increases, a point may be reached whereby one or more of the armature choppers (810, 812, 814, and 816) are turned on full time, and armature current will be limited by the available supply voltage. Without intervention, motor field current could rise to a dangerous level while attempting to maintain the target value of battery current. When this condition occurs, the motor field current may be slowly reduced until chopper control of armature current is restored.

During brake operations, target value for armature current may be the value proportional to the voltage on a control circuit in a multiple unit (MU) cable, in the range of 0-70V, reaching a maximum of 765 A at 70V or higher. Traction motor armature current (DC average value) should be controlled during braking to its target value as defined above or to the amount of motor field current, whichever is less. Traction motor field current (DC average value) should also be controlled, to the least of the following: (a) a constant maximum current of 765 amps; (b) the amount that will limit battery group current to 400 A with armature current not to exceed field current; (c) the amount that will limit battery voltage to 794 V with armature current not to exceed field current; and (d) the temporarily reduced amount needed to limit the rate of current increase when the brake control lever is advanced. However, as train speed increases, a point may be reached whereby one or more armature choppers are turned off full time, and direct control of armature current is no longer possible. At this and higher speeds, armature current can be reduced only by further reduction of motor field current. Under this condition armature current may exceed field current, notwithstanding above provisions to the contrary.

During transient conditions, such as when the throttle or brake control lever is advanced to a higher position, the affected current (armature and/or field) should preferably rise to its new target value at a nearly constant rate over a three-second interval. The battery current limit, if applicable, should also rise immediately to its new target value if higher than its previous value. When the throttle or brake control lever is moved to a lower position, the affected current should preferably fall to its new lower target value within a short time, for example, within 0.5 second.

Dynamic brake resistors or brake grids 832 may be provided to supplement the batteries during braking operation, when power generated by the traction motors is greater than accessory loads and the batteries can accept. A sixth chopper circuit module 830, consisting of three identical sections, may be connected to the common DC bus 801 and control the brake grids 832. The brake grids 832 may be split into three identical groups, each powered by one section of the chopper 830. Each section of the grid chopper 830 may be given a "turn-on" signal with the same switching interval used for the armature choppers (810, 812, 814, and 816), and then turned off after a definite time interval, or pulse width. The turn-on signals may be fed to the three chopper sections in sequence, each following that for the previous section by one third of the switching interval, in order to minimize ripple in the supply current. According to some embodiments of the present invention, dynamic braking may be activated when battery group current exceeds 375 amps, or when battery terminal voltage exceeds 778 volts. Average grid current may be regulated to hold the battery current or voltage at their respective limits.

The inherent physical and chemical characteristics of batteries limit the amount of regenerative power that can be captured by an RESS. Thus, reducing the power generated by the braking system will allow for greater energy capture over a route. For example, a six-axle locomotive may generate 4,000 horsepower from regenerative braking. However, even large battery systems including multiple long strings with the high charge acceptance are challenged to accept more than 1,000-3,000 horsepower. Instead of distributing the excess regenerative power through a braking grid as described above, the locomotive may alternatively manage the locomotive's braking force and braking duration so that the regenerative braking system does not produce more horsepower than the batteries in the RESS can receive. In other words, the locomotive may control the braking system to regenerate power at a rate and level that is customized to the physical and chemical characteristics of the batteries within the RESS.

In one aspect of the invention, the locomotive uses look-ahead information processed by the LAS to control the braking system to manage the amount and rate of regenerative energy recaptured and transferred to the RESS. Using information about the batteries' physical and chemical characteristics, the RESS provides the LAS with information about the rate and amount of power the RESS can accept from the regenerative braking system. The LAS then determines the force and duration with which to apply the brakes needed to meet the power limitations of the RESS. That is, the LAS may customize the control of the regenerative braking system to the specific physical and chemical characteristics of battery. For example, the LAS may determine that during one section of a locomotive's route, the braking system must apply half as much force over twice the distance to lower the amount of regenerative power increasing the recaptured amount of energy or reducing the amount of braking power from 4,000 horsepower to 2,000 horsepower. The LAS may then use track and route information to determine where on its route to apply regenerative brakes with less force, and therefore, lower power generation over a longer distance to maximize energy recovery. The LAS may make this determination before the train embarks on its route, in real-time, as the train is traveling en route to its destination, or in consideration of other train traffic causing unplanned train stops.

As another example, the LAS may use contextual information about the track, such as its terrain or topography, to control the braking system to generate the optimal amount of regenerative energy. For example, the LAS may use track and route information to determine that the locomotive is approaching a hill with a steep incline, followed by a short, steep decline. Typically, a short and steep decline would cause the braking system to generate excessive braking power, such as 3,000-4,000 horsepower, which could not be effectively recaptured by the RESS. However, using contextual information, such as the track's topography, the LAS may recalculate the force and duration with which to apply the brakes to account for the track's elevation and angle of decline, maximizing energy recovery. That is, the LAS may determine that the locomotive may need a greater distance to moderate the regenerative braking power to 2,000 horsepower as a result of the steep hill decline. Thus, with contextual track and route information, such as track elevation and topography, the LAS may further optimize the amount of power generated by the regenerative braking system to align with the power limitations of the RESS.

As yet another example, the LAS may use traffic information to control the braking system to generate the optimal amount of regenerative energy in consideration of traffic delays and unscheduled train stops. Typically, stopping a train in a siding due to traffic congestion, track maintenance, scheduling delays, or other interfering movement increases energy consumption. Applying the energy storage system would reduce the amount of energy consumed as a result of traffic delays and unscheduled train stops. To minimize the amount of energy lost caused by train traffic, the LAS may control the braking system to generate the optimal amount of regenerative energy in consideration of traffic delays and unscheduled train stops. That is, if the LAS determines that the train will have to slow to a complete stop at a traffic siding because of interfering movements of other trains, the LAS may recalculate the force and duration with which to apply the brakes to account for the power limitations of the RESS, and distance to the anticipated traffic siding. For example, the LAS may determine that the train will have to stop at a siding in 3 miles, due to traffic congestion, track maintenance, scheduling delays, or other interfering traffic activity. Typically, the train may determine the appropriate distance and braking force to apply based on variables including distance, freight weight, passenger load, train speed, train length, or contextual track information, such as topography, track curvature, and track weather conditions (i.e., the presence of moisture, liquids, or ice). Considering only these variables, the train may apply the brakes for 1.5 miles to come to a complete stop, causing the braking system to generate excessive braking power, such as 3,000-4,000 horsepower, which may not be effectively recaptured by the RESS. However, using train traffic information in conjunction with the information about the rate and amount of power the RESS can accept from the regenerative braking system, the LAS may calculate the force and duration with which to apply the brakes to maximize energy recovery. That is, the LAS may determine that the locomotive may apply the brakes over a greater distance and with less force, to moderate the regenerative braking power to 2,000 horsepower. Thus, using traffic information, the LAS may further optimize the amount of power generated by the regenerative braking system to align with the power limitations of the RESS.

In some cases, the power generated by the regenerative braking system is in excess because the RESS is already at, or near full storage capacity. That is, even when the regenerative braking system is moderated to deliver power at a rate tailored to the batteries' physical and chemical characteristics, because the SOC of the batteries are full, the RESS cannot accept any additional power from the regenerative braking system. In one aspect of the invention, the LAS may use look-ahead information to determine the optimal time to free up charge capacity in the batteries in the RESS. Specifically, the LAS may determine which sections of a train's route the braking system is expected to generate a large amount of regenerative power. Using this information, the LAS may communicate to the RESS to lower its batteries' SOC in anticipation of receiving a large amount of energy generated by the regenerative braking system. For example, the LAS may use information about an approaching hill with a sharp incline and decline to free up charge capacity in the RESS in anticipation of a large amount of regenerative energy generated on the decline. Specifically, as the locomotive is approaching the incline, the LAS may instruct the locomotive to draw more energy from the RESS to lower its batteries' SOC and free up its charge capacity. With a lowered SOC, the RESS will then be able to recapture a greater amount of the regenerative energy recaptured from the braking system during its descent down the hill's decline. Thus, the LAS may use look-ahead information to coordinate the amount of free charge capacity of the RESS with the amount of regenerative power generated by the braking system in accordance with the physical and chemical characteristics of the RESS.

Figure 11:
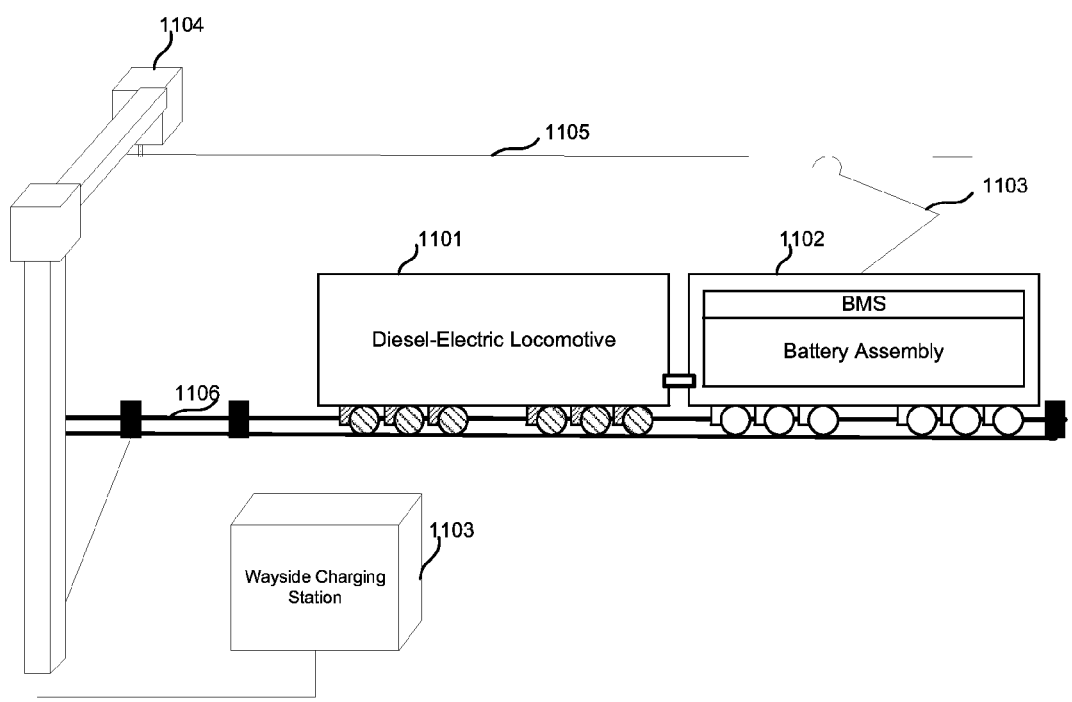
FIG. 11 illustrates an exemplary train configuration involving all-electric or battery-toting locomotives and off-locomotive energy storage systems in accordance with embodiments of the present invention.

In some cases, the RESS may not be capable of lowering the SOC fast enough to accommodate the full amount of power generated by the regenerative braking system. In one aspect of the invention, the LAS may use information about the location of wayside energy storage stations to help recapture the full amount of power generated by the regenerative braking system. For example, if the LAS determines it is approaching a hill that will generate a large amount of regenerative braking power on the decline, the system may utilize a wayside energy storage station located on the descending grade to transfer any excess energy generated by the braking system. FIG. 11, discussed below, describes the transfer of energy from the RESS to a wayside energy storage system.

Figure 9A:
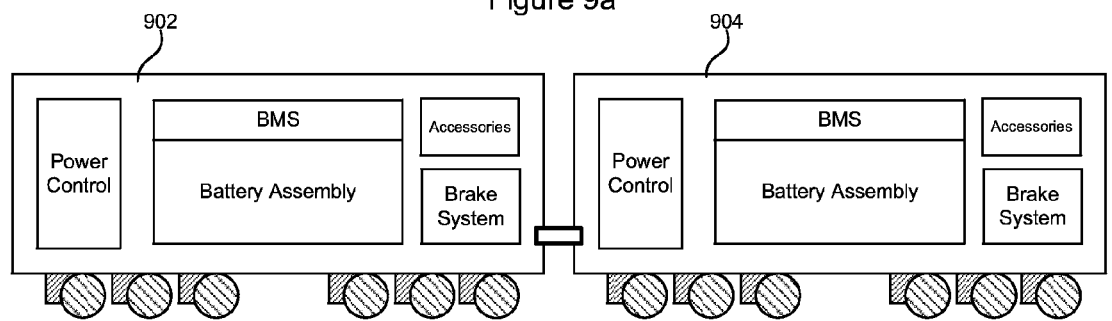
FIGS. 9a and 9b illustrate exemplary configurations of battery-operated, all-electric locomotives in accordance with embodiments of the present invention.
Figure 9B:
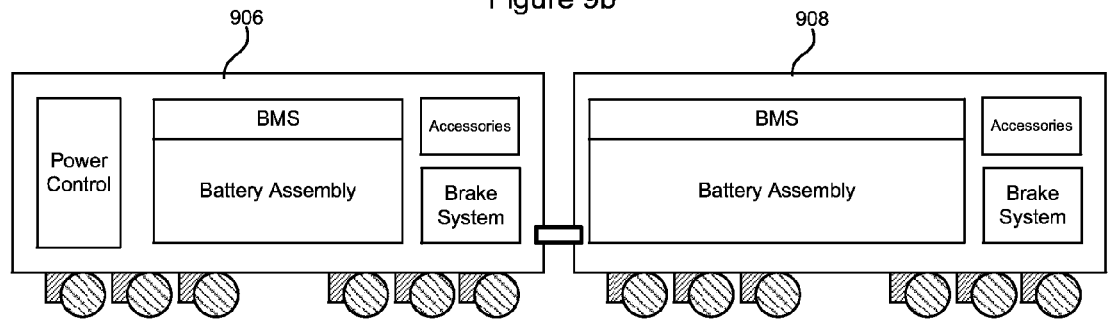

FIGS. 9a and 9b illustrate exemplary configurations of battery-operated, all-electric locomotives in accordance with embodiments of the present invention.

FIG. 9a shows a first battery-operated, all-electric locomotive 902 being mechanically and electrically coupled with a second battery-operated, all-electric locomotive 904. The first locomotive 902 and the second locomotive 904 may have same or similar designs and configurations much like the exemplary battery-powered locomotives described above. The locomotives 902 and 904 may be operated in tandem with their respective battery management systems, power control systems, and brake systems coordinating with one each other. According to some embodiments of the present invention, it may be advantageous to operate two, three or even more battery-powered locomotives cooperatively in this or similar configuration, for example, to collectively increase horsepower output, operating range/duration, and/or braking force. Each individual locomotive and/or their motors may be switch on or off upon demand.

FIG. 9b shows a first battery-powered, all-electric locomotive 906 coupled to a second locomotive 908 in a mother-slug configuration. The locomotive 908 (slug) may carry extra batteries (in a secondary battery assembly) to provide additional energy storage capacity for the main locomotive 906. The locomotive 908 may have its own auxiliary battery management system, or, alternatively, the secondary battery assembly may be managed entirely by the BMS installed on the main locomotive 906. Similarly, the locomotive 908 may or may not have a separate set of brake system and/or accessories. Preferably, the locomotive 908 may be equipped with traction motors subject to the power control of the main locomotive 906, so as to provide additional driving and/or braking force and potentially to increase energy recovery from regenerative braking.

Figure 10A:
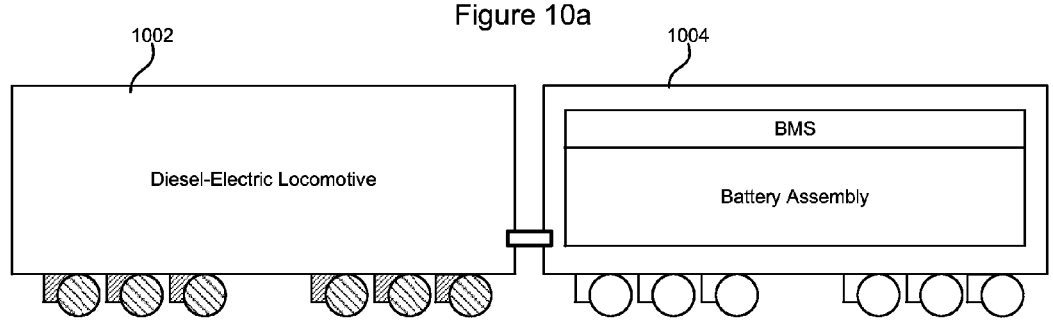
FIGS. 10a and 10b illustrate more exemplary train configurations involving all-electric or battery-toting locomotives in accordance with embodiments of the present invention.
Figure 10B:
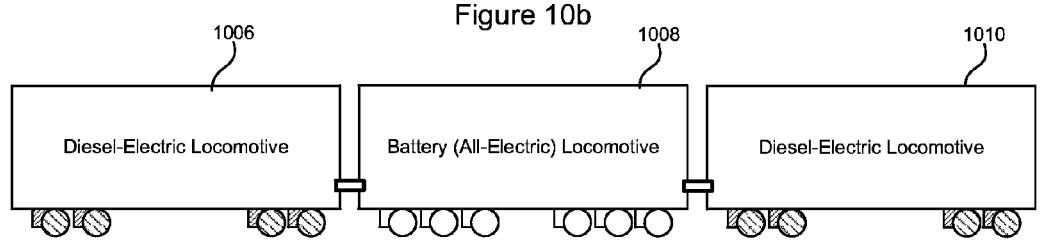

FIGS. 10a and 10b illustrate more exemplary train configurations involving all-electric or battery-toting locomotives in accordance with embodiments of the present invention.

FIG. 10a shows a diesel-electric locomotive 1002 coupled with an all-electric or battery-toting locomotive 1004, which together provide the driving power for a train. The locomotive 1002 may have a same or similar design as a traditional diesel-electric locomotive having one or more diesel engines which drive an electric generator that in turn powers traction motors. The locomotive 1004 carries no internal combustion engine but may carry a battery assembly and a battery management system. According to some embodiments of the present invention, the battery assembly may comprise rechargeable batteries that can be recharged through regenerative braking and/or directly by the diesel engine(s) aboard the locomotive 1002. According to one embodiment, the locomotive 1004 may include no traction motor of its own. Thus, the locomotive 1004 will contribute little to and consume little from its on-board battery assembly. Instead, the battery assembly will store energy recovered from traction motors of the locomotive 1002 (and/or be recharged by the diesel engine(s) thereon), and the battery power will be supplied to the traction motors of the locomotive 1002 upon demand. According to another embodiment, the locomotive 1004 may include its own traction motors which may contribute to regenerative braking and may also consume power from the battery assembly. In that case, the battery power may or may not be shared with the diesel-electric locomotive 1002. In either case, a DC bus may couple the locomotive 1002 with the locomotive 1004.

It should be noted that, although FIG. 10a only shows one diesel-electric locomotive coupled with one all-electric or battery-toting locomotive, more than one locomotive of each type may be included in a similar train configuration or variations thereof. For example, FIG. 10b shows a preferred embodiment wherein one battery (all-electric) locomotive 1008 is directly coupled with and positioned in between a first diesel-electric locomotive 1006 and a second diesel-electric locomotive 1010. The battery locomotive 1008 may include at least a battery assembly and a battery management system. Energy recovered from regenerative braking of the locomotives 1006 and 1010 may be channeled to the locomotive 1008 to recharge its battery assembly. Battery power from that battery assembly may also be supplied to the locomotives 1006 and 1010 to drive (or assist in driving) their traction motors upon demand. The locomotive 1008 may have its own traction motors which may be driven by the battery assembly and/or recover braking energy to recharge the battery assembly. Alternatively, the locomotive 1008 may have no traction motor at all.

According to one embodiment of the invention, the locomotive relies on the energy in the RESS during idle periods or slow travel speeds, when the diesel engine(s) aboard the locomotive 1002 is not efficient. For example, the energy in the RESS may be used in a lower throttle notches, such as notches 1, 2. and 3, when the engine requires under 800 horsepower. Conversely, the energy from the RESS may be used to provide extra horsepower to the diesel engine, when for example, the throttle is placed at notches 7 & 8.

FIG. 11 illustrates the locomotive components for transferring energy from the RESS to a wayside charger in accordance with one embodiment of the invention. The RESS transfers energy from the on board energy storage system to a discontinuous electrification system, such as a third rail, 1106, or an overhead line system, 1105. The discontinuous electrification system is typically placed selectively along a track corridor. For example, the discontinuous electrification system may only provide catenary or third-rail energy transfer where there are steep grade levels, and where it may be economically feasible. The on board energy storage system may transfer energy to the discontinuous electrification system with an overhead line connection device 1103, such as a pantograph, bow collector, or trolley pole. Overhead power line towers, 1104, may be coupled to the overhead line system to a wayside energy storage station 1103. According to alternative embodiments of the present invention, the wayside energy storage station, 1103, may comprise batteries, ultra-capacitors, flywheels, or other types of energy storage mechanisms. In accordance with one embodiment of the invention, when the LAS communicates to the RESS to lower its SOC by transferring a specified amount of energy to a wayside energy storage system, the RESS transfers the specified amount of energy to the overhead line system, 1105, using the overhead line connection device, 1103. Overhead power line towers 1104 then transfer energy from the overhead line system to a wayside energy storage station 1103. In accordance with another embodiment of the invention, when the LAS communicates to the RESS to lower its SOC by transferring a specified amount of energy to a wayside energy storage system, the RESS transfers the specified amount of energy to the third rail, 1106, which then transfers the energy to power line towers 1104, and then to a wayside energy storage station 1103.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

The invention claimed is:
1. A locomotive comprising:
a first locomotive platform carrying no internal combustion engine on board;
a battery assembly including strings of batteries;
a plurality of traction motors powered by the battery assembly to drive the locomotive platform;
a DC bus coupling the battery assembly to the plurality of traction motors;
a battery management system that monitors and equalizes the batteries to maintain a desired state of charge (SOC) and depth of discharge (DOD) for each battery;
a motor control circuitry in cooperation with the battery management system to draw currents, within throttle-dependent limits, from the battery assembly to drive the plurality of traction motors;
a brake system that controls a regenerative braking mechanism to recover brake energy to recharge the battery assembly; and
a look-ahead system that receives spatial data, the look-ahead system coupled to the battery management system and brake system;
wherein the brake system controls the locomotive's braking activity based on the look-ahead data and battery management system data.

2. The locomotive according to claim 1, wherein the motor control circuitry draws energy from the battery management system based on look-ahead data to maintain a desired SOC or DOD.

3. The locomotive according to claim 1, wherein the look-ahead data comprises track terrain, track topography, track electrification connectivity, traffic information, and locations of wayside energy storage systems.

4. The locomotive according to claim 1, further comprising an off-locomotive energy storage system, and a device that connects the battery management system to the off-locomotive energy storage system;
wherein the battery management system transfers energy to the off-locomotive energy storage system based on the look-ahead data.

5. The locomotive according to claim 1, further comprising an insulated-gate bipolar transistor chopper circuit coupling the battery assembly to the DC bus.

6. The locomotive according to claim 1, wherein at least a portion of the batteries in the battery assembly are rechargeable batteries.

7. The locomotive according to claim 1, wherein the battery management system further comprises a plurality of BMS units, each said BMS unit comprising a microcontroller or microprocessor, a charge equalization circuit comprising a bi-directional DC-DC converter operatively connected to a temporary buffer for battery equalization, and at least one temperature sensor, and each said BMS unit being operatively connected with one of the strings of batteries and configured to:
(a) measure electrical parameters of said string of batteries,
(b) monitor temperatures of said string of batteries, and
(c) equalize charges among the batteries of said string to maintain a desired state of charge (SOC) and depth of discharge (DOD) for each battery.

8. The locomotive according to claim 1, wherein the motor control circuitry is configured to limit a traction motor armature current to the least of: (a) a target armature current value based on a desired throttle position; (b) an amount needed to maintain a total current of the one or more strings based on the desired throttle position; and (c) a temporarily reduced amount needed to limit a rate of current increase when the throttle position is advanced.

9. The locomotive according to claim 6, further comprising:
a recharging interface for coupling the battery assembly to a charging station to recharge the rechargeable batteries while they are installed on the locomotive platform.

10. The locomotive according to claim 1, wherein at least a portion of the batteries in the battery assembly are removably installed on the locomotive platform, and wherein the locomotive is re-fueled by swapping at least some of the removably installed batteries with fresh batteries.

11. The locomotive according to claim 1, wherein each said each BMS unit further comprises a controller-area network (CAN) bus interface to communicate with other BMS units or microcontrollers and devices without going through a host computer.

12. The locomotive according to claim 1, wherein the motor control circuitry comprises a chopper circuit module in cooperation with the regenerative braking mechanism to return current to the battery assembly.

13. The locomotive according to claim 5, wherein each of the strings comprises the same number of identical batteries, and wherein the strings are connected to the insulated-gate bipolar transistor chopper circuit.

14. The locomotive according to claim 1, wherein batteries in each of the strings are equalized with one another within that string.

15. The locomotive according to claim 1, wherein at least one battery external to each of the one or more strings is designated and used as a holding tank or buffer during battery equalization.

16. The locomotive according to claim 1, wherein the battery management system further commands cooling or air-circulation equipment to equalize temperatures of the strings of batteries.

17. The locomotive according to claim 1, wherein the motor control circuitry comprises one chopper circuit module for controlling armature current of each of the plurality of traction motors.

18. The locomotive according to claim 1, wherein each battery in the battery assembly is a lead-carbon battery.

19. The locomotive according to claim 16, wherein the battery management system limits a depth of discharge of each lead-carbon battery at or below approximately 35%.

20. The locomotive according to claim 16, wherein each of the one or more strings comprises fifty-four serially-connected 12-volt lead-carbon batteries.

21. The locomotive according to claim 18, wherein the battery assembly comprises thirty-two parallel strings.

22. The locomotive according to claim 1, wherein the motor control circuitry comprises one chopper circuit module for controlling a current in serially-connected field windings of the plurality of traction motors.

23. The locomotive according to claim 1, wherein the battery assembly comprises batteries selected from a group consisting of: lead-carbon batteries, zinc-bromine batteries, nickel-zinc batteries, nickel metal hydride (NiMH) batteries, lithium-ion (Li-ion) batteries, lithium polymer (Li-poly) batteries, lithium sulfur (Li—S) batteries, lithium-nickel-manganese-cobalt (NMC).

24. The locomotive according to claim 1, wherein an operator cabin or compartment is located towards the rear end of the first locomotive platform or on another platform separate from the first locomotive platform.

25. The locomotive according to claim 1, wherein the battery assembly is positioned in a forward position on the first locomotive platform to utilize a natural air flow during train movement to cool the battery assembly, the locomotive further comprising video and/or computer monitoring equipment for train operation from other than said forward position occupied by the battery assembly.

26. The locomotive according to claim 1, wherein the battery management system includes one sensor for every cell.

27. The locomotive according to claim 1, further connected to a second locomotive platform separate from, and coupled to, the first locomotive platform, the second locomotive platform carrying at least one diesel-electric engine.

28. A locomotive comprising:
a first locomotive platform carrying no internal combustion engine on board;
a first battery assembly, carried on the first locomotive platform, including one or more strings of batteries;
a second locomotive platform, in tandem with the first locomotive platform, carrying no internal combustion engine on board;
a second battery assembly, carried on the second locomotive platform, including one or more strings of batteries;
a plurality of traction motors powered by the first and/or the second battery assemblies to drive the first and the second locomotive platforms;

a DC bus coupling the first and the second battery assemblies to the plurality of traction motors;

a battery management system that monitors and equalizes the batteries to maintain a desired state of charge (SOC) and depth of discharge (DOD) for each battery;

a motor control circuitry in cooperation with the battery management system to draw currents, within throttle-dependent limits, from the battery assembly to drive the plurality of traction motors;

a brake system that controls a regenerative braking mechanism to recover brake energy to recharge the battery assembly; and a look-ahead system that receives spatial data, the look-ahead system coupled to the battery management system and brake system;

wherein the brake system controls the locomotive's braking activity based on the look-ahead data and battery management system data.

29. The locomotive according to claim 28, wherein the motor control circuitry draws energy from the battery management system based on look-ahead data, to maintain a desired SOC or DOD.

30. The locomotive according to claim 28, wherein the look-ahead data comprises track terrain, track topography, track electrification connectivity, traffic information, and locations of wayside energy storage systems.

31. The locomotive according to claim 28, further comprising an off-locomotive energy storage system, and a device that connects the battery management system to the off-locomotive energy storage system;

wherein the battery management system transfers energy to the off-locomotive energy storage system based on the look-ahead data.

32. The locomotive according to claim 28, further comprising an insulated-gate bipolar transistor chopper circuit coupling the battery assembly with the DC bus.

33. The locomotive according to claim 28, wherein the battery management system further comprises a plurality of BMS units, each said BMS unit comprising a microcontroller or microprocessor, a charge equalization circuit comprising a bi-directional DC-DC converter operatively connected to a temporary buffer for battery equalization, and at least one temperature sensor, and each said BMS unit being operatively connected with one of the strings of batteries and configured to:
 (a) measure electrical parameters of said string of batteries,
 (b) monitor temperatures of said string of batteries, and
 (c) equalize charges among the batteries of said string to maintain a desired state of charge (SOC) and depth of discharge (DOD) for each battery.

34. The locomotive according to claim 28, wherein the motor control circuitry is configured to limit a traction motor armature current to the least of: (a) a target armature current value based on a desired throttle position; (b) an amount needed to maintain a total current of the one or more strings based on the desired throttle position; and (c) a temporarily reduced amount needed to limit a rate of current increase when the throttle position is advanced.

35. A train comprising:
 two or more battery-powered, all-electric locomotives in coordination with one another, each of the two or more battery-powered, all-electric locomotives comprising:
  a locomotive platform carrying no internal combustion engine on board;
  a battery assembly including one or more strings of batteries;
  a plurality of traction motors that can be powered by the battery assemblies of the two or more locomotives to drive the locomotive, the plurality of traction motors receiving no power supplied from any power source external to the train during operation;
  a DC bus coupling the battery assembly to the plurality of traction motors;
  a battery management system that monitors and equalizes the batteries to maintain a desired state of charge (SOC) and depth of discharge (DOD) for each battery;
  a motor control circuitry in cooperation with the battery management system to draw currents, within throttle-dependent limits, from the battery assembly to drive the plurality of traction motors;
 a brake system that controls a regenerative braking mechanism to recover brake energy to recharge the battery assembly; and
 a look-ahead system that receives spatial data, the look-ahead system coupled to the battery management system and brake system;
 wherein the brake system controls the locomotive's braking activity based on the look-ahead data and battery management system data.

36. The locomotive according to claim 35, wherein the motor control circuitry draws energy from the battery management system based on look-ahead data, to maintain a desired SOC or DOD.

37. The locomotive according to claim 35, wherein the look-ahead data comprises track terrain, track topography, track electrification connectivity, and locations of wayside energy storage systems.

38. The locomotive according to claim 35, further comprising an off-locomotive energy storage system, and a device that connects the battery management system to the off-locomotive energy storage system;
 wherein the battery management system transfers energy to the off-locomotive energy storage system based on the look-ahead data.

39. The locomotive according to claim 35, wherein the battery management system further comprises a plurality of BMS units, each said BMS unit comprising a microcontroller or microprocessor, a charge equalization circuit comprising a bi-directional DC-DC converter operatively connected to a temporary buffer for battery equalization, and at least one temperature sensor, and each said BMS unit being operatively connected with one of the strings of batteries and configured to:
 (a) measure electrical parameters of said string of batteries,
 (b) monitor temperatures of said string of batteries, and
 (c) equalize charges among the batteries of said string to maintain a desired state of charge (SOC) and depth of discharge (DOD) for each battery.

40. The locomotive according to claim 35, wherein the motor control circuitry is configured to limit a traction motor armature current to the least of: (a) a target armature current value based on a desired throttle position; (b) an amount needed to maintain a total current of the one or more strings based on the desired throttle position; and (c) a temporarily reduced amount needed to limit a rate of current increase when the throttle position is advanced.

41. A train comprising:
at least one diesel-electric locomotive, each of the at least one diesel-electric locomotive comprising:
   one or more diesel engines driving an electric generator, and
   a first plurality of traction motors powered by the one or more diesel engines through the electric generator;
at least one all-electric locomotive coupled with the at least one diesel-electric locomotive, each of the at least one all-electric locomotive comprising:
   a locomotive platform carrying no internal combustion engine on board,
   a battery assembly including one or more strings of batteries,
   a second plurality of traction motors powered exclusively by the battery assembly to drive the locomotive platform, the second plurality of traction motors receiving no power supplied from any power source external to the train during operation,
   a DC bus coupling the battery assembly to the second plurality of traction motors, and
   a battery management system that monitors and equalizes the batteries to maintain a desired state of charge (SOC) and depth of discharge (DOD) for each battery;
   a motor control circuitry in cooperation with the battery management system to draw currents, within throttle-dependent limits, from the battery assembly to drive the plurality of traction motors;
   a brake system having a regenerative braking mechanism to recover brake energy from the first and/or the second plurality of traction motors to recharge the battery assembly; and
   a look-ahead system that receives spatial data, the look-ahead system coupled to the battery management system and brake system;
   wherein the brake system controls the locomotive's braking activity based on the look-ahead data and battery management system data.

42. The train according to claim 41, wherein the DC bus couples the at least one all-electric locomotive with the at least one diesel-electric locomotive.

43. The train according to claim 41, wherein:
the at least one all-electric locomotive consists of a single all-electric locomotive;
the at least one diesel-electric locomotive consists of a first diesel-electric locomotive and a second diesel-electric locomotive; and
the single all-electric locomotive is directly coupled with and positioned between the first diesel-electric locomotive and the second diesel-electric locomotive.

44. The locomotive according to claim 41, wherein the motor control circuitry draws energy from the battery management system based on look-ahead data, to maintain a desired SOC or DOD.

45. The locomotive according to claim 41, wherein the look-ahead data comprises track terrain, track topography, track electrification connectivity, and locations of wayside energy storage systems.

46. The locomotive according to claim 41, further comprising an off-locomotive energy storage system, and a device that connects the battery management system to the off-locomotive energy storage system;
   wherein the battery management system transfers energy to the off-locomotive energy storage system based on the look-ahead data.

* * * * *